US Patent Number: 4,705,192
Date of Patent: Nov. 10, 1987

Knapton

[54] REUSABLE MULTI-COMPARTMENT CONTAINER WITH CHARGING AND DISCHARGING MEANS

[76] Inventor: Paul A. Knapton, 619 Bay Ridge Ave., Brooklyn, N.Y. 11220

[21] Appl. No.: 866,942

[22] Filed: May 27, 1986

[51] Int. Cl.⁴ .......................... B67D 5/60; B65B 1/04
[52] U.S. Cl. ............... 222/144.5; 222/142.9; 222/568; 141/98
[58] Field of Search ............ 222/144.5, 144, 566–568, 222/532, 136, 548, 556, 142.9, 23, 158; 141/98, 325, 326, 340–343; 220/253; 215/6, 100 R

[56] References Cited

U.S. PATENT DOCUMENTS

| | | | |
|---|---|---|---|
| 1,925,962 | 9/1933 | Hoyer | 222/142.9 |
| 2,241,368 | 5/1941 | Schlumbohm | 222/460 |
| 2,445,101 | 7/1948 | Bailey | 222/158 X |
| 3,006,506 | 10/1961 | Germano | 222/158 X |
| 3,130,874 | 4/1964 | Bulmer | 222/142.9 X |
| 3,209,961 | 10/1965 | Wassell | 222/158 X |
| 3,325,844 | 6/1967 | Lampe | 222/548 X |
| 3,380,307 | 4/1968 | Stillinger | 222/142.9 |
| 3,439,841 | 4/1969 | Rhodes | 222/142.5 |
| 3,874,429 | 4/1975 | LaFarge | 141/98 |
| 4,217,940 | 8/1980 | Wheeler | 141/340 X |
| 4,549,674 | 10/1985 | Alticosalian | 222/144.5 X |

FOREIGN PATENT DOCUMENTS

| | | | |
|---|---|---|---|
| 455385 | 10/1936 | United Kingdom | 222/568 |
| 700803 | 12/1953 | United Kingdom | 222/568 |

Primary Examiner—Joseph J. Rolla
Assistant Examiner—Gregory L. Huson

[57] ABSTRACT

A reusable multi-compartment container permitting the storage of up to three pourable materials. A swivel mounted selector acts as a compartment selector or seal; a charging and discharging device positioned atop the selector is operational in two modes for either decanting or charging, or portaging the invention, additionally this device may function as a compartment seal in one of its embodiments.

4 Claims, 8 Drawing Figures

REUSABLE MULTI-COMPARTMENT CONTAINER WITH CHARGING AND DISCHARGING MEANS

BACKGROUND OF THE INVENTION

1. Field of the Invention

The present invention relates to an article of manufacture intended for use as a multi-compartment container. More specifically, as a device containing up to three pourable materials in separate compartments from which eacy may be charged and discharged therefrom by the use of a common means acting either as a charging funnel or as a discharging spout.

The present invention enables the user to handily portage in one device three chemical substances which previously were transported in seperate containers. Particularly useful to users of household laundry cleaning chemicals such as detergent, bleach and fabric softener. Each chemical as a pourable substance in a powdered or granular solid, liquid or slurry form. By the use of the present invention, the user can bulk purchase said necessary chemical cleaning agents for laundering and fill the device at, for instance, home, with only the required quantities of chemicals necessary for the anticipated wash load number and size before utelizing them at, for instance, a self-service commercial laundry. The present invention makes the portaging, measuring and dispensing of such chemicals handy with a minimum of fuss and leakage.

2. Description of the Prior Art.

Previously multi-compartment containers and means of dispensing have been disclosed before. In the Patent literature, Class 222 Sub-Class 142.9 includes numerous inventions wherein seperate compartment containers are described somewhate similar to the present invention. U.S. Pat. No. 4,380,307 shows a multiple container package with a means to select a radially oriented compartment by the use of a cover disc rotatable around a common axis with various orafice configurations differentiating a pouring or shaking means of dispensing which varies the volume and type of flow desired. However, a major disassembly of the cap and cover disc may be performed in order to fill or re-fill the invention. The present invention uses a means of filling and discharging much differently, namely, the fact that disassembly of any of the components is not required to either charge or discharge the device and the same apertures function in both the discharging and charging mode.

SUMMARY OF THE INVENTION

It is an object of the invention to provide a multi-compartment container that permits up to three liquid or powdered solid chemicals to be portaged in one device within seperate compartments.

It is another object of the invention to provide a reusable multi-compartment container and a charging means that allows the user to predetermine the type and volume of chemicals charged into the device.

It is yet another object of the invention to utelize a means that dually facilitates the transfer of chemical agents into their respective compartments and simultaneously aids in the discharge of said chemical agents.

It is also another object of the invention to permit the passage of chemical agents used in laundering through a common orafice without fouling and coagulation.

It is a further object of the invention to provide a multi-compartment container with an integral charging and discharging means; both means deployed togethr in one structure and manipulated in a foolproof manner.

These and other objects of the invention are achieved by the use of a pivotal selector which when positioned accordingly can provide direct access to any of the compartments which are angularly offset from one another around a common central axis, or conversely, when positioned between adjacent apertures covers all apertures sealingly preventing spillage or cross-contamination. A rotatable flow directing device or funnel shaped structure directs flow into a passage on the selector. The rotational capability of the flow derecting device allows for two primary objects, first, it positions a handle outwardly facing for carrying the invention and secondly, it positions the spout outwardly facing making the invention able to easily discharge the contents of the compartments. Additionally, a third functional capability of the flow directing device as a sealing means is incorporated into the invention. By rotating the flow directing device, a covering seal is positioned over the selector aperture without having to reposition the selector aperture as previously described.

Other objects and advantages will be apparent from the following description and attatched drawing.

BRIEF DESCRIPTION OF THE DRAWIANG

DESCRIPTION OF THE PREFERRED EMBODIMENTS

Figures 1, 2, 3:
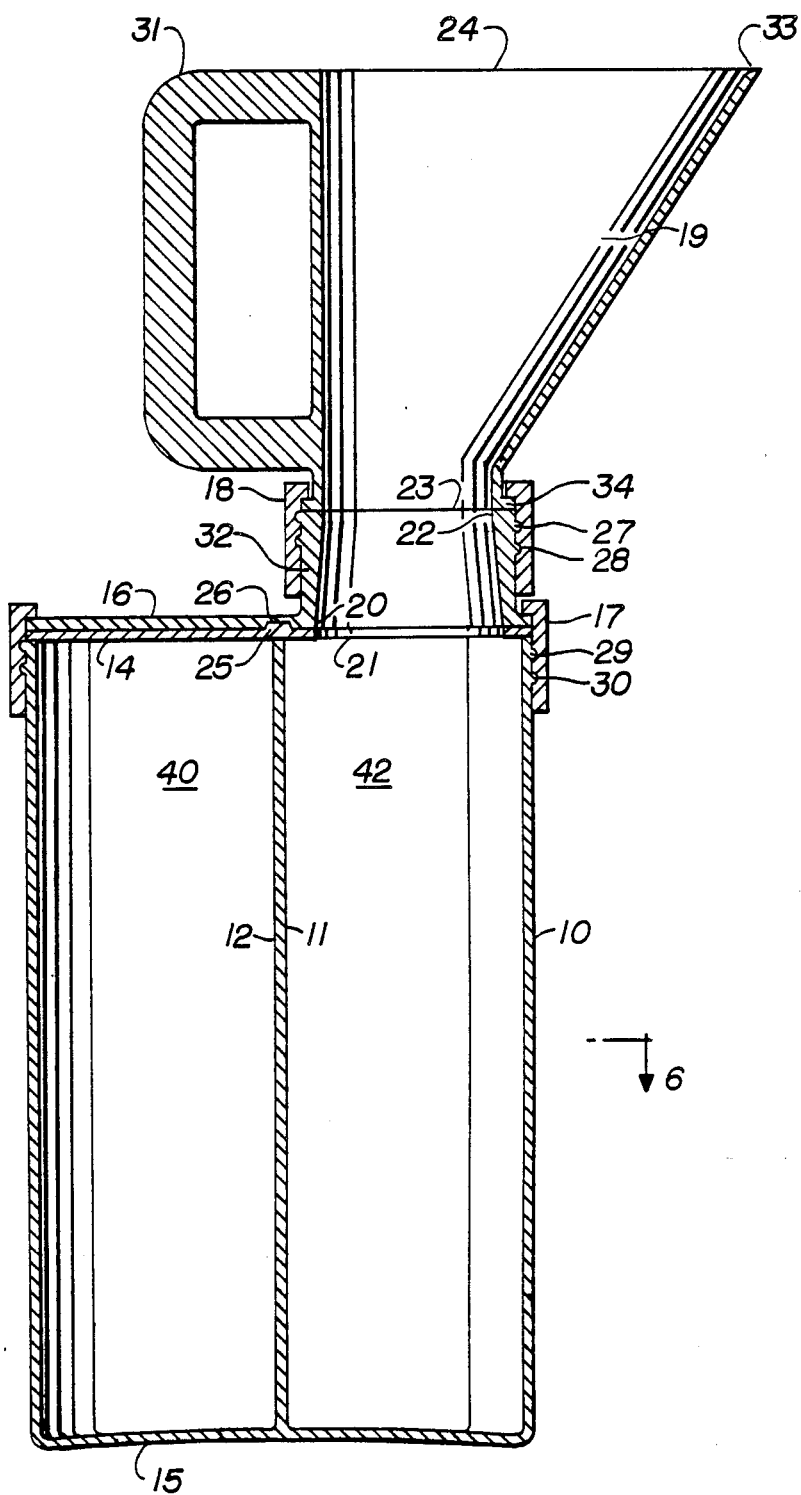
FIG. 1 is a vertical cross-sectional view of one embodiment of the present invention.
FIG. 2 is a partial vertical cross-sectional view of an alternative arrangement of the top including a downwardly extending neck finish with an integral thread or thread segments.
FIG. 3 is a partial vertical cross-sectional view of an alternative arrangement of the base.
Figure 5:
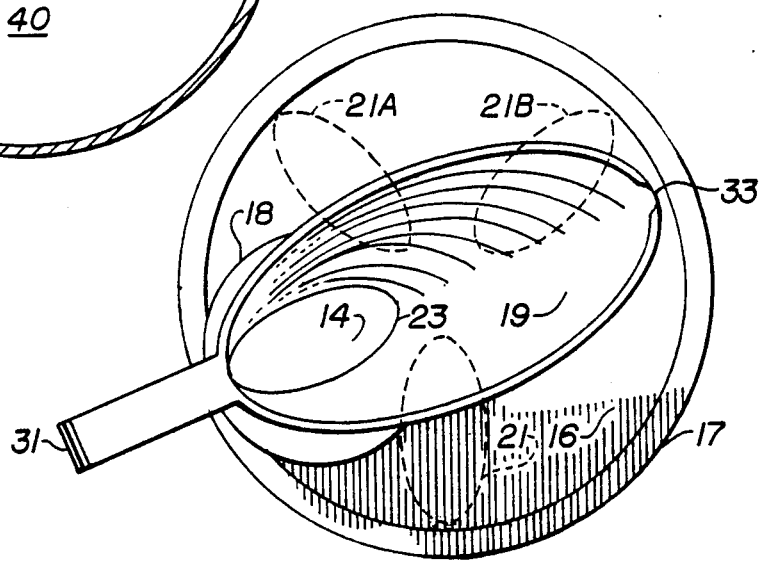
FIG. 5 is a top view in a portaging mode.

Referring to FIGS. 1 and 5, a container portion consisting of an outside wall 10, three internal bulkhead partitions 11, 12 and 13, best viewed in FIG. 5 and a base 15 comprise a means to store seperately up to three different chemical agents in compartments 40, 41 and 42 respectively created therein. In the preferred embodiment shown, said outside wall, bulkhead partitions and base are integrally formed of a thermoplastic material. A forming process, namely, extrusion blow molding, utilizing a trifurcated mandrel to shape a preform with the desired alignment of the internal bulkhead partitions, outside wall and base. The preform can thus be converted into a container in a blow molding apparatus. Other means of fabrication will be apparent to those skilled in the art. A light transmitting thermoplastic material such as a high density polyethelene (HDPE), oriented polypropylene (PP) or polyvinyl chloride (PVC) that are blended so as to meet the necessary requirements of the invention; three of which are of being nonreactive to the three chemicals, durable for multiple reuses and free from chemical cause stree cracks, and transparent or translucent so as to allow viewing of the quantities therein.

The outside wall may be of regular shape of substantial height, preferrably of a right circular cylindrical shape, however, a conical, jug-like or bulbous shape may be desired. Any type of outside wall shape and configuration may be assumed without detracting from the intention of the present invention. At the open end of the container formed, located exteriorly on the outside wall is a raised external thread or thread segments 29, in addition, can be content and/or volummetric indicia corresponding to each compartment. Indicia can be of applied or embossed nature.

A notional central longitudinal axis vertically aligned through the center of the container whereby said internal bulkhead partitions converge and are integrally formed to each other for the full height of the container and at the opposing end to the outside wall. Said bulkhead partitions are angularly offset from one another. Said base provides a means of continuously connecting the bottom of said outside wall and each bulkhead partition. A preferred arrangement for the angular relationship of the bulkhead partitions is such that the volummetric rations of the compartments 40, 41 and 42 within the tripartite container are 2:1:1. This volummetric preference is the approximate proportion of laundry detergent, bleach and fabric softener used in a typical wash load. It will be apparent that the ratios of the compartments bear a direct correspondence to the chemical agents commercially available. For instance, an increased concentration of chemical cleaning strength in the detergent may require a small volume within the container and a corresponding change in ratio.

FIG. 3 shows an alternative arrangement between base, bulkhead partitions and outside wall whereby a seperately formed circular shaped bottom closure 15A is continuously attatched in a leakproof manner by heat fusion, of which any suitable process, such as ultrasonic welding, for example, to each bulkhead partition (not shown), and outside wall 10B (as shown). Said bottom closure may include a continuous upending flange providing contact between the interiour vertical surface and the exterior surface of the outside wall 10B.

A circular shaped top 14 of a diameter equal to the outside diameter of outside wall 10, or if the outside wall is of non-cylindrical nature as previously described, then equal to the outside diameter of the open end of the body or neck portion. Said top may be injection molded of a thermoplastic material as described and is attatched at all points formed along the exposed end edge of outside wall 10 and each internal bulkhead partition 10, 11 and 12 respectively, to create a continuous leakproof seal and contains three compartment access apertures 21, 21A and 21B, as shown in FIG. 5, of elliptical shape providing a means of passage with compartments 40, 41 and 42 respectively. Said apertures are radially displaced from notional central vertical axis in a manner such that each said aperture's major diameter bisects the angle formed by subtending bulkhead partitions; each compartment receives one means of access. Each said aperture is equidistantly spread longitudinally of an equal dimension from the central vertical axial location and the distance seperating adjacent apertures is at least greater than each apertures minor diameter. At the center of said top corresponding to the notional central vertical axis of the container portion on the exteriorly facing horizontal surface is a raised frusto conical protuberance 25.

A compartment access selector 16 provides a means to individually communicate with apertures 21, 21A or 21B respectively, or as may be desired, in a non-communicating position which prevents the passage of contents to or from all of the compartments. Said compartment access selector is formed of thermoplastic material such as previosly described and may be fashioned in an injection molding apparatus. Said compartment access selector consists of a circular portion with a diameter equal and in contact with top 14 containing a recessed central frustoconical depression 26, an elliptical shaped compartment selector bottom aperture 20, a tubular raised neck 32 portion arising vertically and enclosing said compartment selector bottom aperture which terminates at a top horizontal bearing surface with an inscribed elliptical top aperture 22. A means of passage between compartment selector bottom aperture 20 and compartment selector top aperture 22 of said raised neck portion of the compartment access selector, is formed by the use of an inscribed wall. Both said top and bottom apertures are coaxially aligned with each aperture's main diameter extending outwardly to a central point plumb to the notional central vertical axis. On the raised neck 32 an exteriorly located raised thread or thread segments 27 is positioned. Compartment selector bottom aperture 20 is a shape of identical geometrical proportioning as apertures 21, 21A and 21B. Said compartment selector bottom aperture is spaced laterally of an equal longitudinal dimension from said notional central vertical axial location.

A selector linkage 17 provides a means to engage the compartment access selector 16 contact between said comparment access selector's lower horzontal surface and the top's upper horizontal surface. Said selector linkage may be injection molded of a thermoplastic material, for instance, like HDPE as previously described. Said selector linkage means consists of a circular ring-like structure with a depending flange providing contact with outside wall 10 by means of a continuous internal grooved thread or thread segments 30 mating with external thread or thread segments 29 formed on the exterior of outside wall 10. When said selector linkage is loosened, a rotational movement of the compartment access selector 16 on the top's upper horizontal surface around said raised frustoconical protuberance allows the user to select any of the apertures 21, 21A or 21B in the top by bringing into alignment compartment selector bottom aperture 20 for transfer of chemical agents or alternatively, the user may position the compartment access selector bottom aperture 20 between adjacent said apertures of the top. When the said compartment selector bottom aperture is aligned with said aperture in the top, a tightening of said selector linkage will provide positive contact between said compartment access selector and said top thereby allowing passage from or into said compartment or when positioned between adjacent apertures of said top and said selector linkage is tightened the passage of the chemical agents is hindered by the covering of all apertures in said top by the said compartment access selector's lower horizontal surface.

FIG. 2 depicts an alternative means of providing contact pressure adjustment between the selector linkage 17, the compartment selector 16 and the top 14. Such an arrangement can allow for a different fabrication process of the outside wall, bulkhead partitions and base. In such an arrangement, an outside wall 10A is fabricated without an external thread or thread segments or any raised portions. A top 14A with a depending flange with an internal vertical surface in contact with and bonded to the outside wall 10A. An exteriorly located raised thread or thread segments 29A provides a means to secure a selector linkage 17A with an interiorly located groove thread or thread segments 30A thereby providing a means to loosen or tighten the pressure provided by the said flange underside horizontal surface on the top of the compartment selector 16A.

A funnel shaped structure 19 provides a passage for charging and discharging functions and a means for grasping the invention for both portaging and decanting. Said funnel shaped structure may be formed of a thermoplastic material as previously described by blow molding the funnel portion and compression molding the handle portion together in one apparatus. Other suitable means of fabrication will be apparent to thosed skilled in the art. The funnel shaped structure 19 consists of a main opening 24 and a port opening 23 both of differing geometrical properties and connected together by a wall of predetermined thickness providing a means of passage. Said openings are of elliptical proportions, axially offset and in parallel planes. At one edge of said main opening tangent to the major diameter a spout 33 or deformed lip facilitates flow during pouring; at the opposite end a handle 31 is integrally molded. At the base of the funnel shaped structure 19 a base flange 34 coplaner with said port opening has an outside diameter equal to the raised neck 32.

A funnel linkage 18 provides a means to loosen or tighten the base flange 34 contact between the lower horizontal surface and the upper horizontal surface of the raised neck 32. Said funnel linkage may be injection molded of a thermoplastic material such as HDPE, or as previously described. Said fjnnel linkage consists of a circular ring-like structure with a depending flange providing contact pressure adjustment with the exterior wall of said raised neck by means of a continuous internal grooved thread or thread segments 28 mating with the external thread or thread segments 27 formed on the outside of said raised neck. When the funnel linkage 18 is tightened to said thread or thread segments, the lower horizontal surface of the base flange 34 in contact with the upper horizontal surface of the raised neck 32 is compressed together thereby creating a leakproof seal. Alternatively when loosened, said funnel shaped structure can freely rotate around the raised neck 32 or can be completely detached.

Figure 4:
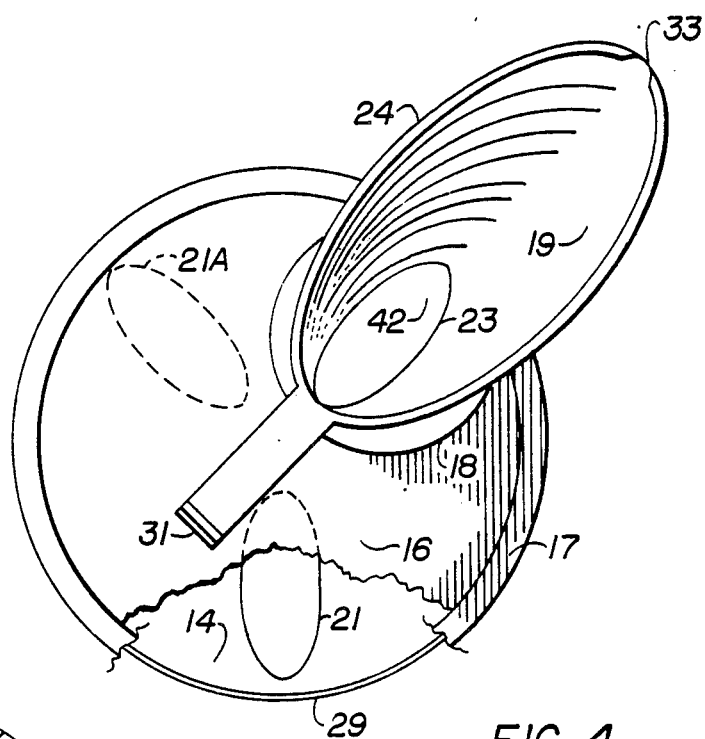
FIG. 4 is a top view in a charging and discharging mode with a removed portion of the compartment access selector and selector linkage.
Figure 6:
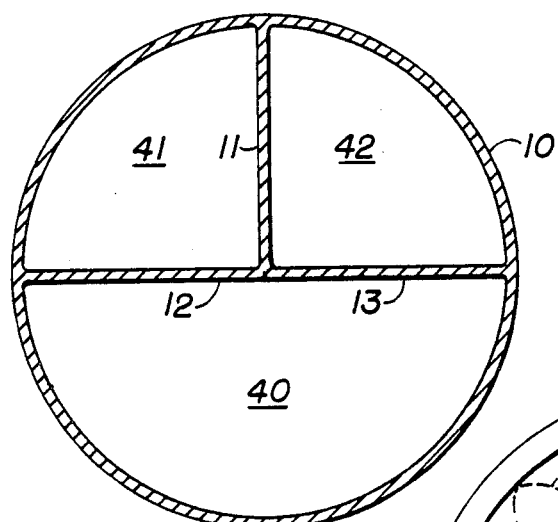
FIG. 6 is a horizontal cross-sectional view as shown in FIG. 1.

FIGS. 4 and 5 show two modes of functioning. Referring to FIG. 4, the compartment access selector bottom aperture 20 is positioned over the aperture 21B, (hidden to view). The funnel shaped structure 19 is rotated arcuately on the raised neck 32 into alignment with top aperture 23 thus bringing lip 33 in an outwardly facing position so that the contents in compartment 42 can be decanted or filled. Alternatively, FIG. 5 shows said funnel shaped structure rotated through an arcuate path of one half a full turn from its decanting mode thereby positioning handle 31 outwardly facing the notional central vertical axis. Also when portaging, the compartment access selector 16 must be positioned away from the top apertures as previously described in order to prevent backflow.

Figure 7:
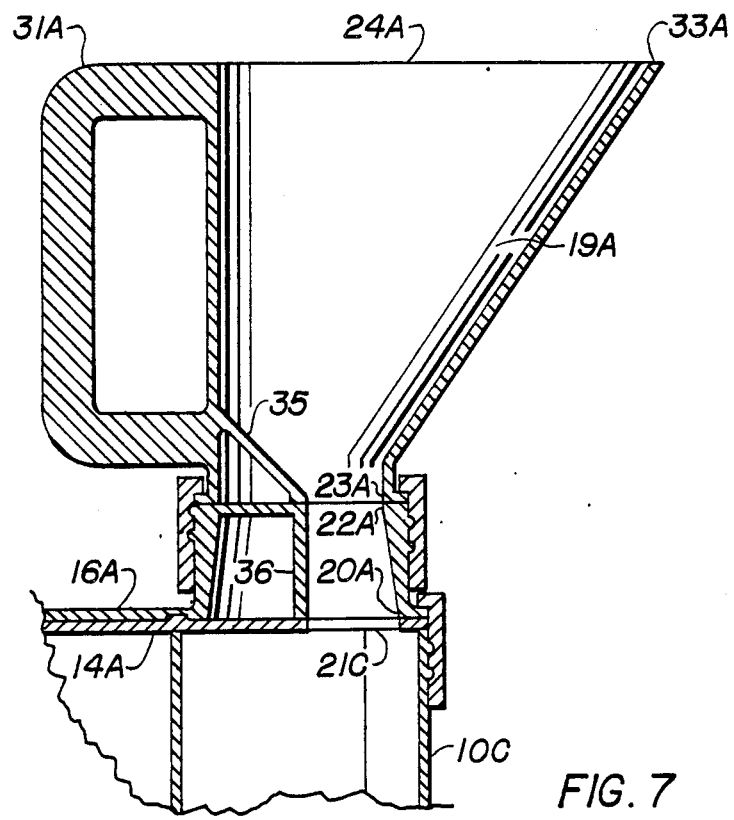
FIG. 7 is a partial vertical cross-sectional view of an alternative arrangement of the invention in a charging and discharging mode.
Figure 8:
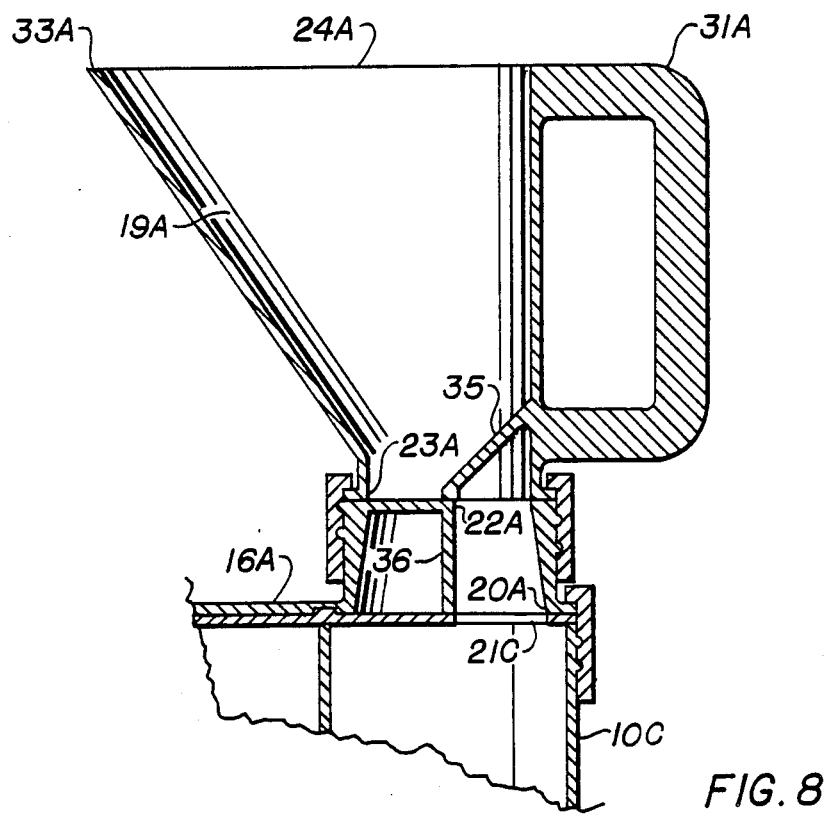
FIG. 8 is a partial vertical cross-sectional view of an alternative arrangement of the invention in a portaging mode.

FIGS. 7 and 8 both show an alternative arrangement whereby the dual positioning capability of said funnel shaped structure previously described in detail includes an additional means to function as a cap or seal, thereby hindering passage of contents from either of the three compartments without having to reposition the compartment access selector 16. In this configuration, referring specifically to its unique features, a top 14A includes three semi-elliptical apertures 21C, 21D and 21E of which size and configuration is less that half the area of the raised neck portion of the compartment access selector. A compartment access selector 16A includes a raised neck portion 32A with an internal passage from which the compartment selector bottom aperture 20A connects the compartment selector top aperture 22A. A side wall 36 of this passage is visible. A funnel shaped structure 19A includes a port opening 23A of equivalent shape and size of the said compartment selector top aperture. A lower flow director 35 directs passage of contents to the said compartment selector top aperture. FIG. 7 shows the openings in the compartment access selector positioned over top aperture, for instance as is seen in the drawing, aperture 21C, and port opening 23A allows the passage of contents into or out of the invention. Lip 33A is outwardly facing the notional central vertical axis. FIG. 8 shows the funnel shaped structure 19A in a subtending position whereby the flow director 34 inhibits the passage of backflow from the compartment thereby acting as an effective seal when the funnel linkage is tightened.

To facilitate positioning both the funnel shaped structure in its two modes upon the upper horizontal surface of the raised neck an the compartment selector bottom aperture with any of the apertures in the top, the use of outwardly projecting boss or bosses in the base flange and receptive detents or the like in the upper horizontal surface of the raised neck may be used; likewise, the same may be employed between the compartment access selector and top. These features are not described in detail since they are well known in the art.

To further reduce clearances in the sealing region between both the top and compartment access selector and the base flange and the upper horizontal surface of the raised neck, the molding of both compartment access selector and base flange may be in a distorted shape so that they are elastically stressed when compressed by their respective linkages, thereby providing an improved seal preventing leakage or coagulation. Alternatively, another means achieving the same desired sealing effect may be employed by positioning resilient sealing members between the two respective surfaces.

It will be understood that all apertures in the top and compartment access selector must be of equal size and shape. Although the elliptical shape described herein in detail, other shapes such as circular providing a suitable means of passage may be substituted. Also, the elliptical and semi-elliptical shapes described in the compartment selector top aperture and port opening of the funnel shaped structure may be of other geometrical configuration, such as, circular or semi-circular.

The raised neck provides a passage connecting upper and lower apertures as described. The passage may be integral with the said raised neck engaging the raised neck at one or more points or may be seperate. The passage may be sloped providing a transition between the apertures of different size, shape or orientation.

Whereas, the invention has been described in relation to its preferred embodiments thereof, it is understood that other modifications may be made therein without departing from the spirit thereof and the scope of the appended claims.

What is claimed is:

1. A multi-compartment container with a flow directing means for charging and discharging comprising: an outside wall of symmetrical regular shape and of substantial height having partitions of the same height which are angularly offset from one another and extend inwardly from said outside wall to converge at a common longitudinal axis of the container, said partitions forming a plurality of sealed compartments of sector-like configuration with said outside wall; a base forming a means of closure of symmetrical regular shape secured to one end of said outside wall and partitions; a top closure forming a means of covering the other end formed by said outside wall and partitions, and which is provided with a plurality of apertures concentrically arranged about and spaced from said longitudinal axis of the container thus providing a means of passage from each compartment, and a protuberant surface on said closure raised above a plane defined by an upper horizontal surface of the top closure and being coaxial with said longitudinal axis; a rotatable compartment access selector with a horizontal surface of regular shape covering the top closure and containing a recessed depression centrally located on the underside to mate with said protuberant surface and therein, an access aperture of identical geometrical shape as said top closure apertures and radially spaced from said longitudinal axis such that said access aperture is alignable with said top closure apertures, and a tubular cylindrical raised neck portion on said access selector extending upwardly therefrom and inscribing the access aperture, and which terminates in a top aperture at the opposite end; a selector linkage providing a means of adjusting contact pressure between the top closure and compartment access selector by the use of a ring placed over the top horizontal surface of said selector with a flange depending from the periphery of the ring and which detachably engages said outer wall by means providing longitudinal adjustment of said flange axially of said container outer wall; a funnel shaped structure with an elliptical main opening having a lip and a handle on opposing sides of the main opening and which tapers downwardly to a smaller minor opening and having a base flange radially extending therefrom with an outside diameter equal to an outside diameter of said raised neck portion at the top thereof, said base flange being in contact with and coplanar with a upper horizontal surface of said raised neck defined by the top thereof, providing for a rotational placement of said handle and lip portions relative to said outside wall in at least two positions; a funnel linkage providing a means of adjusting contact pressure between the base flange of the funnel shaped structure and upper horizontal surface of the raised neck portion of the compartment access selector by the use of a ring placed over the top horizontal surface of the base flange with a flange depending from the periphery of the ring and which detachably engages said tubular portion by means providing longitudinal adjustment of said funnel linkage flange axially of said tubular portion.

2. An arrangement as defined in claim 1 wherein said base in integrally molded with the outside wall and partitions.

3. An arrangement as defined in claim 1 wherein the means of providing adjustable contact pressure between the top closure and compartment access selector is achieved by a continuous internal grooved segment interiorly located within the flange of the selector linkage and a continuous thread or thread segments integrally molded on the exterior of the outside wall, and wherein the means of providing adjustable contact pressure between the funnel shaped structure base flange and the raised neck of the compartment access selector is achieved by a continuous internal grooved segment interiorly located within the flange of the funnel linkage and a continuous thread or thread segments integrally molded on the exterior of the raised neck portion of the compartment access selector.

4. An arrangement as defined in claims 1, 2 or 3 wherein the top closure apertures, compartment access selector aperture and raised neck top aperture, and the minor opening of the funnel shaped structure are of semi-elliptical shape and further valvingly co-act; the raised neck portion of the compartment access selector including an internal passage eccentrically disposed relative to a central vertical axis of the tubular cylindrical raised neck as defined by it's outer diameter and positionable to be coaxial to said semi-elliptical apertures formed in the top closure; said top aperture is formed on the raised neck within said upper horizontal surface further comprising a bearing surface for said minor opening of said funnel shaped structure and which minor opening is formed eccentrically within the base flange such that when the funnel shaped structure is rotated atop said horizontal surface of the raised neck and the handle portion is directed away from said longitudinal axis, said minor opening is located on opposite sides of the top aperture formed in the horizontal bearing surface on the raised neck portion of the compartment access selector to prevent flow from the container through the raised neck and funnel shaped structure.

* * * * *